United States Patent
Bei

(10) Patent No.: US 9,971,411 B2
(45) Date of Patent: May 15, 2018

(54) METHOD, INTERACTIVE DEVICE, AND COMPUTER READABLE MEDIUM STORING CORRESPONDING INSTRUCTIONS FOR RECOGNIZING USER BEHAVIOR WITHOUT USER TOUCHING ON INPUT PORTION OF DISPLAY SCREEN

(71) Applicant: HTC Corporation, Taoyuan County (TW)

(72) Inventor: Jing-Jo Bei, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 0 days. days.

(21) Appl. No.: 14/101,366

(22) Filed: Dec. 10, 2013

(65) Prior Publication Data

US 2015/0160730 A1  Jun. 11, 2015

(51) Int. Cl.
| | | |
|---|---|---|
| G06K 9/00 | (2006.01) | |
| G06F 3/01 | (2006.01) | |
| G06F 3/03 | (2006.01) | |
| G06F 3/042 | (2006.01) | |

(52) U.S. Cl.
CPC .............. *G06F 3/017* (2013.01); *G06F 3/012* (2013.01); *G06F 3/0304* (2013.01); *G06F 3/042* (2013.01); *G06K 9/00234* (2013.01); *G06K 9/00335* (2013.01)

(58) Field of Classification Search
None
See application file for complete search history.

(56) References Cited

U.S. PATENT DOCUMENTS

| | | | |
|---|---|---|---|
| 8,406,482 B1 | 3/2013 | Chien et al. | |
| 2009/0002514 A1 | 1/2009 | Steinberg | |
| 2009/0175509 A1 | 7/2009 | Gonion et al. | |
| 2009/0263022 A1* | 10/2009 | Petrescu et al. | 382/195 |
| 2010/0079371 A1* | 4/2010 | Kawakami | G06F 3/0485 |
| | | | 345/156 |

FOREIGN PATENT DOCUMENTS

| | | |
|---|---|---|
| CN | 101032405 A | 9/2007 |
| CN | 101226591 A | 7/2008 |
| CN | 101236599 A | 8/2008 |
| CN | 101751219 A | 6/2010 |
| CN | 103412647 A | 11/2013 |
| JP | 2003108980 A | 4/2003 |
| TW | 201346641 | 11/2013 |

OTHER PUBLICATIONS

John C. Russ, The Image Processing Handbook, CRC Press 2002.*
Ba, "Multiperson Visual Focus of Attention from Head Pose and Meeting Contextual Cues", IEEE 2011.*
(Continued)

*Primary Examiner* — Mark Roz
(74) *Attorney, Agent, or Firm* — Winston Hsu

(57) ABSTRACT

A method used in an interactive device and for recognizing a behavior of a user operating on the interactive device includes: capturing a plurality of images; forming a plurality of polygon images corresponding to the plurality of captured images according to a skin-tone model; and performing a function by analyzing the plurality of polygon images.

12 Claims, 12 Drawing Sheets

(56) References Cited

OTHER PUBLICATIONS

Office action dated Nov. 26, 2015 for the Taiwan application No. 103130136, filing date: Sep. 1, 2014.
Office action dated Jul. 16, 2015 for the Taiwan application No. 103130136, filing date Sep. 1, 2014, p. 1 line 12~14, p. 2~5 and p. 6 line 1~8.
Office action dated Apr. 12, 2017 for the China application No. 201410552812.7, filing date Oct. 17, 2014, p. 1-7.
Shen Chang-yu et al., "Localization of human face based on skin module and skin color segmentation", Opto-Electronic Engineering, vol. 34, No. 9, pp. 103-107, Sep. 2007.
Notice of Allowance dated Oct. 30, 2017 for the Taiwan application No. 103130136, filed Sep. 1, 2014, p. 1-4.

\* cited by examiner

METHOD, INTERACTIVE DEVICE, AND COMPUTER READABLE MEDIUM STORING CORRESPONDING INSTRUCTIONS FOR RECOGNIZING USER BEHAVIOR WITHOUT USER TOUCHING ON INPUT PORTION OF DISPLAY SCREEN

BACKGROUND OF THE INVENTION

1. Field of the Invention

The present invention relates to a user interactive scheme, and more particularly to a method used for recognizing user's behavior, a corresponding interactive device, and a computer readable medium storing corresponding instructions.

2. Description of the Prior Art

Generally speaking, most of conventional user interactive schemes without users' touching on a display screen may be operated based on the recognition of user's unique face feature and the recognition of user's unique eye or mouth feature. These conventional user interactive schemes are computing-intensive and memory bandwidth-intensive, and also result in much power consumption. In addition, the environment noise/users pose would also have big impact to hit rate of these schemes so that the conventional user interactive schemes cannot effectively detect user's unique feature. In addition, these conventional schemes cannot detect the distance or related coordinate of device and user continuously. It is important to propose a new and novel user interactive scheme to replace conventional schemes.

SUMMARY OF THE INVENTION

Therefore one of the objectives of the present invention is to provide a novel method, a corresponding interactive device, and/or a computer readable medium storing corresponding instructions that is/are used for recognizing a behavior of a user operating on the interactive device, to solve the above-mentioned problems.

According to an embodiment of the present invention, a method used in an interactive device and for recognizing a behavior of a user operating on the interactive device is disclosed. The method comprises: capturing a plurality of images; forming a plurality of polygon images corresponding to the plurality of captured images according to a skin-tone model; and performing a function by analyzing the plurality of polygon images.

According to an embodiment of the present invention, an interactive device used for recognizing a behavior of a user operating on the interactive device is disclosed. The interactive device comprises a camera circuit and a processing unit. The camera circuit is used for capturing a plurality of images. The processing unit is coupled to the camera circuit, and is used for forming a plurality of polygon images corresponding to the plurality of captured images according to a skin-tone model, and perform a function by analyzing the plurality of polygon images.

According to an embodiment of the present invention, a computer readable medium comprising multiple instructions upon executing these instructions and for recognizing a behavior of a user operating on the interactive device is disclosed. The computer performing the following steps: capturing a plurality of images; forming a plurality of polygon images corresponding to the plurality of captured images according to a skin-tone model; and performing a function by analyzing the plurality of polygon images.

In the above-mentioned embodiments, by calculating and analyzing characteristic parameter(s) with respect to the polygon images that are associated with the user's face, the interactive device, the method, or the set of instructions is capable of recognizing a behavior of a user operating on the interactive device without needing the user's touching on the input portion of interactive device. A novel scheme by building-up user's face skin-tone model dynamically is proposed. This scheme is executed by using pixel-based "skin-tone" classification to classify pixels to be "skin-tone area" or "non-skin-tone area" for captured image frame continuously. After classification phase, the interactive device, method, or instructions can build-up the territory/geometry map of skin-tone color, and then can use classification along with time axis so that the interactive device can analyze the change of the characteristic parameter(s) of incoming/input images along the time axis to understand users' behavior and requirement so as to react the requirements. This novel and smart scheme provides another choice for the user to control/operate the interactive device. This scheme also have less impact to environment's noise and user's pose to have more robust result with less computing power.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
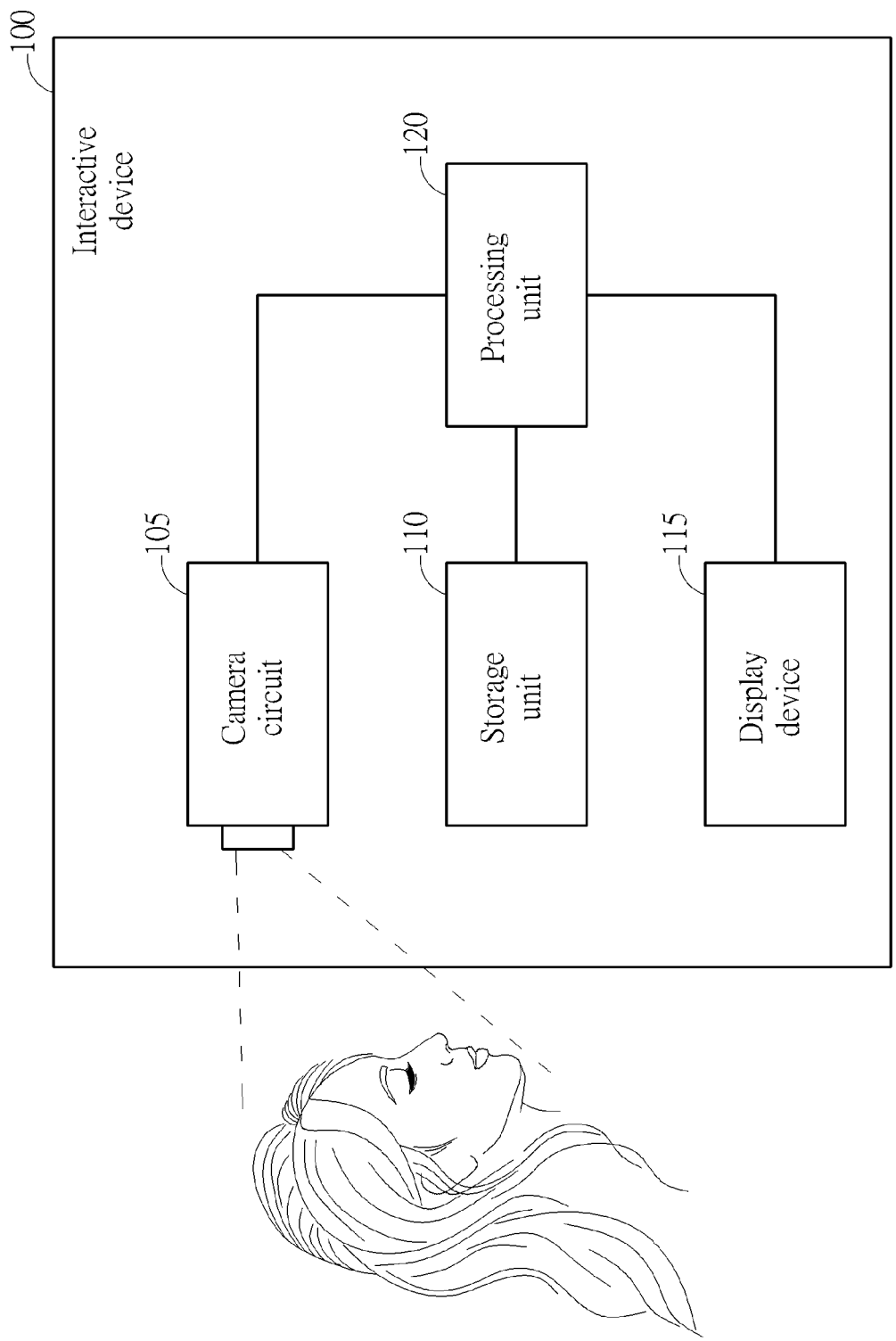
FIG. 1 is a block diagram of an interactive device according to an embodiment of the present invention.
Figure 2A:
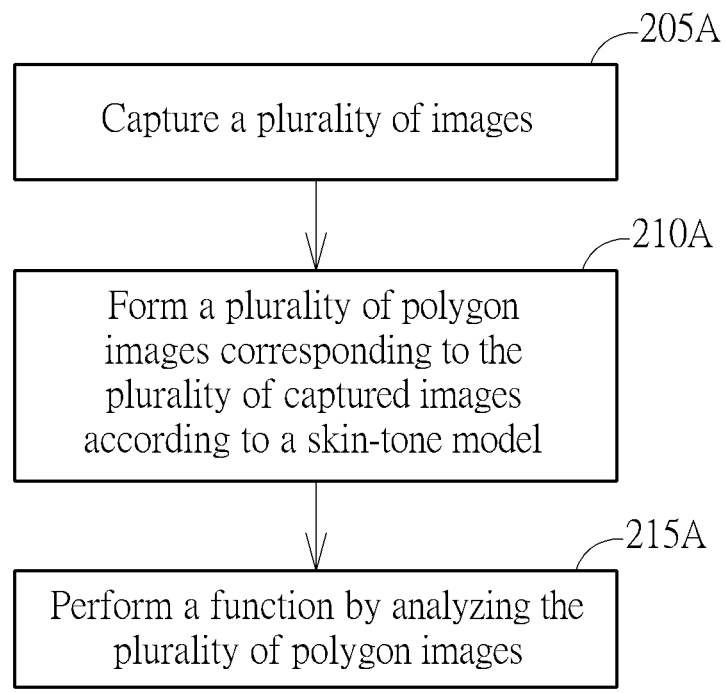
FIG. 2A is a simplified flowchart of the interactive device of FIG. 1.

Please refer to FIG. 1 FIG. 1 is a block diagram of an interactive device 100 according to an embodiment of the present invention. The interactive device 100 is used for recognizing a behavior of a user operating on the interactive device 100. Particularly, the interactive device 100 is capable of recognizing a behavior of a user operating on the interactive device 100 without needing the user's touching on the interactive device 100. In this embodiment, the interactive device 100 is arranged to capture images, identify specific images corresponding to the user from the images, and estimate the specific images so as to recognize the behavior of the user. In practice, the interactive device 100 comprises a camera circuit 105 such as a front-facing camera, a storage unit 110 such as a memory device, a display device 115 such as a display screen, and a processing unit 120 (e.g. a processor) which is coupled to the camera circuit 105, storage unit 110, and display device 115, respectively. FIG. 2A is a simplified flowchart of the interactive device 100 according to the embodiment of the present invention. In Step 205A, the camera circuit 105 is used for capturing a plurality of images. The processing unit 120 is used for forming a plurality of polygon images corresponding to the plurality of captured images according to a skin-tone model (Step 210A), and for performing a function by analyzing the plurality of polygon images (Step 215A).

Figure 2B:
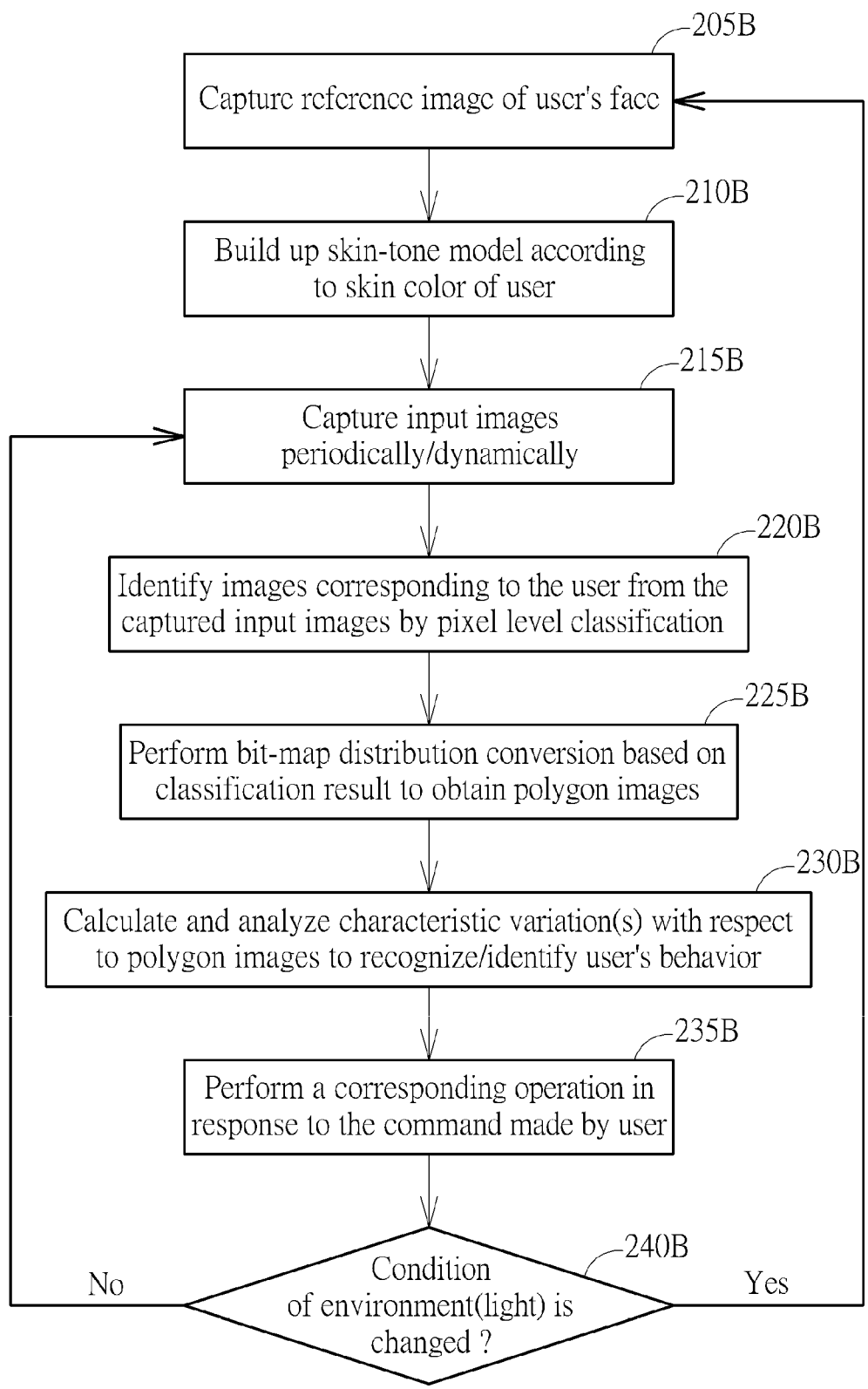
FIG. 2B is a flowchart of another example illustrating the operations of the interactive device as shown in FIG. 1.

Please refer to FIG. 1 in conjunction with FIG. 2B. FIG. 2B is a flowchart of another example illustrating the operations of the interactive device 100 as shown in FIG. 1. Provided that substantially the same result is achieved, the steps of the flowchart shown in FIG. 2B need not be in the exact order shown and need not be contiguous, that is, other steps can be intermediate. In Step 205B, the camera circuit 105 is arranged to capture at least one reference image of the user's face. The operation for capturing the at least one reference image can be performed when the interactive device 100 is turned on (i.e. starts up) or when the interactive device 100 starts to perform a predetermined process after the device 100 starts up. For example, the predetermined process may be an email application, a Web browser, or a document editor application, and so on. When the at least one reference image has been captured or generated, in Step 210B, the processing unit 120 is arranged to build up and/or generate a skin-tone model according to the at least one reference image. Particularly, the processing unit 120 generates the skin-tone model based on a skin color of the user's face included in the at least one reference image. The skin-tone model includes information for indicating the skin color of the user being currently operating the interactive device 100. The built skin-tone model is then stored or buffered in the storage unit 110.

In Step 215B, the camera circuit 105 is utilized for capturing a plurality of input images (i.e. the plurality of captured images mentioned above). Specifically, the camera circuit 105 can be arranged to periodically/dynamically capture the plurality of input images when the interactive device 100 is activated and/or is being operated by the user. The captured input images may include a portion of images associated with the user's face and a portion of images not associated with the user's face. For instance, the images not associated with the user's face may indicate a background image, the user's clothes, and/or other portions not corresponding to the human skin color. Additionally, if two or more users are at front of the camera circuit 105, the two or more users may be photographed by the camera circuit 105. The captured input images may include a portion of images corresponding to multiple users. That is, contents of the input images are not meant to be a limitation of the present invention.

In Step 220B, the processing unit 120 is arranged to identify the images corresponding to the user from the captured input images. The identification is executed based on the skin-tone model which is stored by the storage unit 110. As mentioned above, the skin-tone model is built by the processing unit 120 and stored in the storage unit 110. Additionally, the skin-tone model can be built up by other circuits beforehand. This modification also falls within the scope of the present invention. In Step 220B, specifically, the processing unit 120 is arranged to identify whether the value of a pixel within one input image corresponds to human skin color (i.e. the user's face color) indicated by information of the skin-tone model. If the value of the pixel corresponds to the human skin color, this pixel is classified into a first pixel group by the processing unit 120; if the value of the pixel does not correspond to the human skin color, this pixel is classified into a second pixel group by the processing unit 120. Accordingly, for each pixel, the processing unit 120 obtains a result indicating that the pixel is classified into either the first pixel group associated with the human skin color or the second pixel group not associated with the human skin color. This classification is a pixel level classification executed along with time axis. For each input image, the processing unit 120 obtains a result showing that one portion of pixels are classified into the first pixel group and the other portion of pixels are classified into the second pixel group.

In Step 225B, the processing unit 120 is arranged to execute or perform a bit-map conversion based on the classification result generated in Step 220B. For each pixel, if the classification result indicates that the pixel is classified into the first pixel group, the processing unit 120 is arranged to set a flag of the pixel as bit '1' to indicate that image content of the pixel is associated with the human skin color. If the classification result indicates that the pixel is classified into the second pixel group, the processing unit 120 is arranged to set the flag as bit '0' to indicate that image content of the pixel is not associated with the human skin color. After sequentially setting flags of all the pixels within one input image, the processing unit 120 can obtain a bit-map which indicates bit 0/1 distribution. For the captured input image, the processing unit 120 is used for generate the bit-map by classifying pixels included in this captured input image into either a bit 0 or a bit 1 according to the skin-tone model; for the plurality of captured input images, the processing unit 120 generates the bit-maps by classifying each pixel included in the plurality of captured input images into either a bit 0 or a bit 1.

Figure 3A:
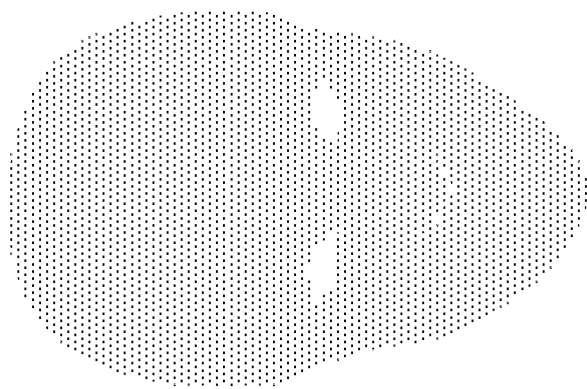
FIGS. 3A-3B are diagrams illustrating an example of the bit-map distribution result and an example of the bit-map distribution result processed by the edge suppression or anti-jaggy.
Figure 3B:
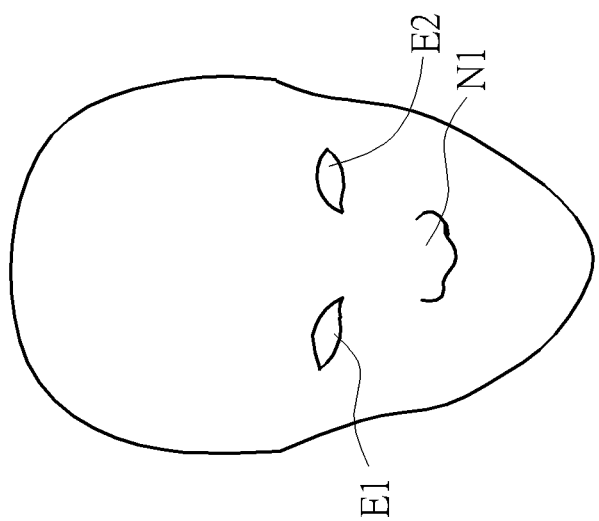

Optionally, after obtaining one bit-map, the processing unit 120 can execute edge suppression or anti-jaggy upon the bit-map to smooth the shape of a polygon-like image range formed by the flags corresponding to bit '1'. The operation of the edge suppression or anti-jaggy is optional, and should not meant to be a limitation of the present invention. Please refer to FIGS. 3A-3B, which are diagrams illustrating an example of the bit-map generated by the processing unit 120 as shown in FIG. 1 and an example of the bit-map after processed by the edge suppression or anti-jaggy. As shown in FIG. 3A, the dots within this input image indicate the pixels associated with the human skin color, and other portions within the input image indicate the pixels not associated with the human skin color. The processing unit 120 executes the edge suppression or anti-jaggy upon the shape of the range formed by the pixels associated with the human skin color to obtain the shape of a polygon image as shown in FIG. 3B. For one input image, as illustrated by FIG. 3B, it can be seen that the processing unit 120 can obtain an example of a polygon image including a face-like shape which includes the eyes E1 & E2 and nose N1. This face-like shape is formed by the polygon image with holes wherein the holes correspond to the eyes E1 & E2 and nose N1. Please refer to FIG. 2B again, in Step 225B, the processing unit 120 obtains the polygon image with holes. Based on the polygon image with holes, the processing unit 120 can recognize or identify that a portion (i.e. the polygon image with holes) within an input image is associated with a human face and the other portion is not associated with a human face. Thus, after processing a plurality of captured input images, the processing unit 120 obtains a plurality of polygon images with holes that are respectively associated with the human face at different timings. It should be noted that the processing unit 120 may obtain polygon images without holes wherein these polygon images are also associated with the human face. The example of the polygon images described above should not be a limitation of the present invention. In addition, in other embodiments, the processing unit 120 can be arranged to obtain the above-mentioned polygon images directly based on the classification result generated in Step 220B without the bit-map conversion. That is, it is helpful to employ the bit-map conversion to calculate the polygon images, and the bit-map conversion is an optional operation.

Thus, by the processing of Step 220B and Step 225B, the processing unit 120 generates the bit-maps indicating a plurality of bit 0/1 distributions corresponding to the captured input images according to the skin-tone model, and then forms the polygon images corresponding to the captured input images according to the bit-maps.

In Step 230B, based on the plurality of obtained polygon images, the processing unit 120 is arranged to calculate and analyze time variation of at least one characteristic parameter with respect to the obtained polygon images to recognize/identify the behavior of the user. The time variation of at least one characteristic parameter means the variation of the at least one characteristic parameter at different timings. The at least one characteristic parameter for example comprises any one or any combination of a median point (or called kernel), the similarity, the mean length/width, and/or the ratio of each face-like shape of the polygon images, etc. The above-mentioned examples of characteristic parameters are merely used for illustration and should not be a limitation of the present invention. After obtaining the calculated and analyzed characteristic parameter(s), the processing unit 120 recognizes or identifies the behavior of the user based on the obtained characteristic parameter(s). By doing so, the processing unit 120 can determine or identify what command is made by the user to operate the interactive device 100. Thus, it is not required for the user to use his/her finger to touch on the display panel of the interactive device 100. For example, based on the analyzed at least one characteristic parameter, the processing unit 120 is capable of identifying or recognizing that the user is turning his/her head to the left or right, moving his/her head to the left or right, moving his/her head up or down, tilting his/head back or forwards, bringing the interactive device 100 to the face, moving the face close to the interactive device 100, or/and bringing the face and the interactive device 100 in proximity to each other. Therefore, the interactive device 100 can know what command is made by the user to operate the interactive device 100 in a condition of not touching on the input portion of interactive device 100. Further, the processing unit 120 can calculate the characteristic parameters in a variety of ways. For example, the parameter of median point (i.e. kernel) can be calculated by using the gravity centers located between the holes (corresponding to two eyes) of the polygon images and/or by referring to multiple edges of each polygon image. In addition, the parameter of similarity can be calculated by referring to the coordinates of each polygon image. All these implementations fall within the scope of the present invention.

In Step 235B, after identifying what command is made by the user, the processing unit 120 is arranged to control the display device 115 or is used with the display device 115 to perform a predetermined process in response to the command made by the user (or in response to the behavior of the user).

In Step 240B, the processing unit 120 is arranged to perform an environmental condition detection to determine whether the condition of the environment is changed or not. Specifically, the processing unit 120 is used for perform a light condition detection to determine whether the condition of light is changed or not. If the condition of light has been changed, the flow proceeds to Step 205B; if the condition of light is not changed, the flow proceeds to Step 215B. The environmental condition detection is used for deciding whether to rebuild up the skin-tone model or not. When the condition of light is changed, it is required to rebuild up the skin-tone model based on new reference image(s) to avoid an error being introduced into the pixel level classification executed by the processing unit 120. Instead, if the condition of light is not changed, it is not required to rebuild up the skin-ton model. Accordingly, in this embodiment, the interactive device 100 builds up the skin-tone model based on new reference image(s) in either one of conditions: (a) the interactive device is turned on, powered on, or waken up; (b) the interactive device starts to perform a predetermined process; and (c) a light condition change is detected. In addition, the operation mentioned in Step 240B is an optional step, and this step may be omitted in other embodiments.

In the embodiments of the present invention, for example, the interactive device 100 may be a portable device such as a smart phone device, and the user may hope to operate the interactive device 100 without using the finger to touch on the input portion of display screen (or touch panel) of the interactive device 100. In this situation, the user may use his/her head to control/operate the interactive device 100. The user may operate the interactive device 100 by turning his/her head to the left or right, moving his/her head to the left or right, moving his/her head up or down, tilting the head back or forwards, bringing the interactive device 100 to the face, moving the face close to the interactive device 100, or/and bringing the face and the interactive device 100 in proximity to each other. When the user makes one of these actions, the action made by the user is photographed and recorded by the camera circuit 105 to generate the input images mentioned above, and the processing unit 120 performs the pixel-level classification according to the skin-tone model, obtains the polygon images including face-like shapes, calculates and analyzes the time variation of at least one characteristic parameter, so as to recognize the user's behavior. That is, the processing unit 120 analyzes the variation of characteristic parameter(s) of the face-like shapes at different timings to recognize what action is made by the user to identify what command is made by the user.

For example, when the user is operating a software application including a scrollbar, the user may move his/her head up or down or tilt the head back or forwards to control and move the scrollbar. In this situation, the processing unit 120 detects a significant change on time variation of at least one characteristic parameter among the median point, the similarity, and/or the mean length/width, and then the processing unit 120 recognizes or identifies the behavior of the user as a scroll action. The significant change on time variation indicates that the at least one characteristic parameter shows an action rapidly made by the user. For example, the user may rapidly move his/her head up or down, and the processing unit 120 may detect a significant change on time variation of the characteristic parameter about the median point. Accordingly, the processing unit 120 may recognize the behavior of the user as the scroll action. However, the significant change on time variation is not meant to be a limitation of the invention. If the user slowly moves his/her head up or down, the processing unit 120 can also detect the time variation of median points and then recognize the behavior of the user as the scroll action. Accordingly, the processing unit 120 can detect a significant change on time variation and/or the time variation of the median points, the similarity, and/or the lengths/widths when the user controls the scrollbar to move up or move down or across this page, and thus the processing unit 120 can identify that the user controls the scrollbar to move up or move down or across this page/document.

Figure 4A:
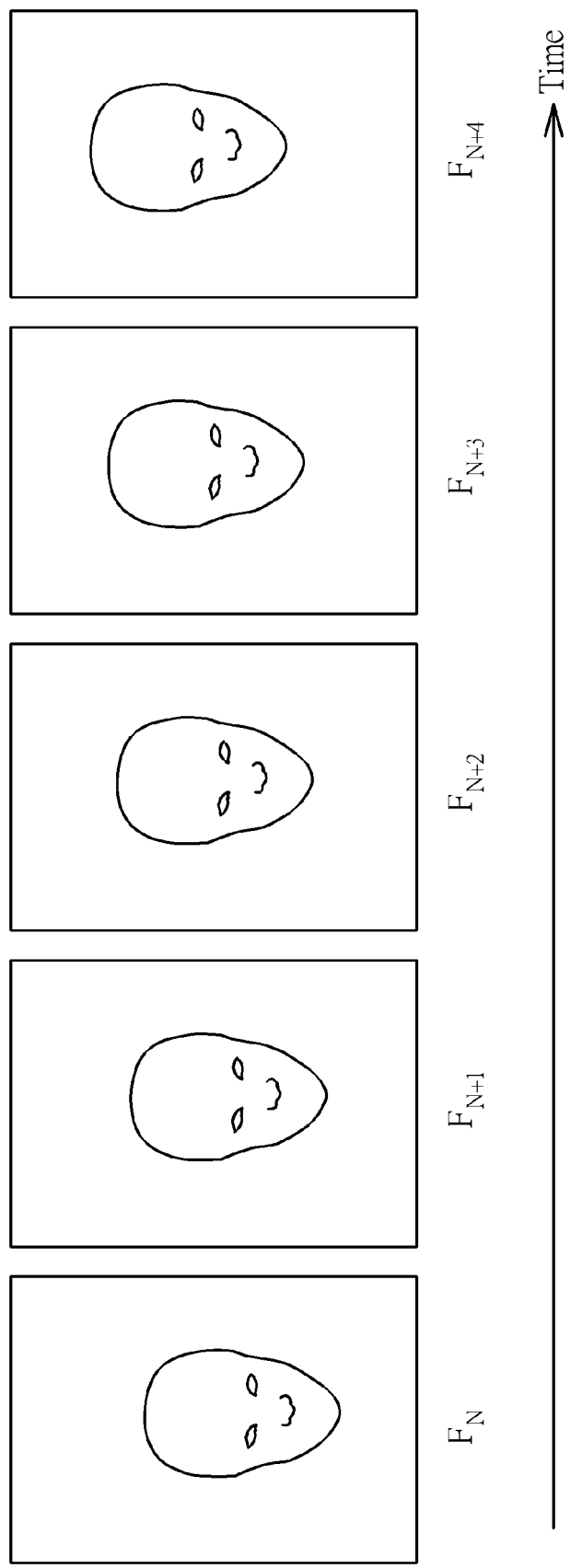
FIGS. 4A-4D are diagrams illustrating four different examples of the polygon images.
Figure 4B:
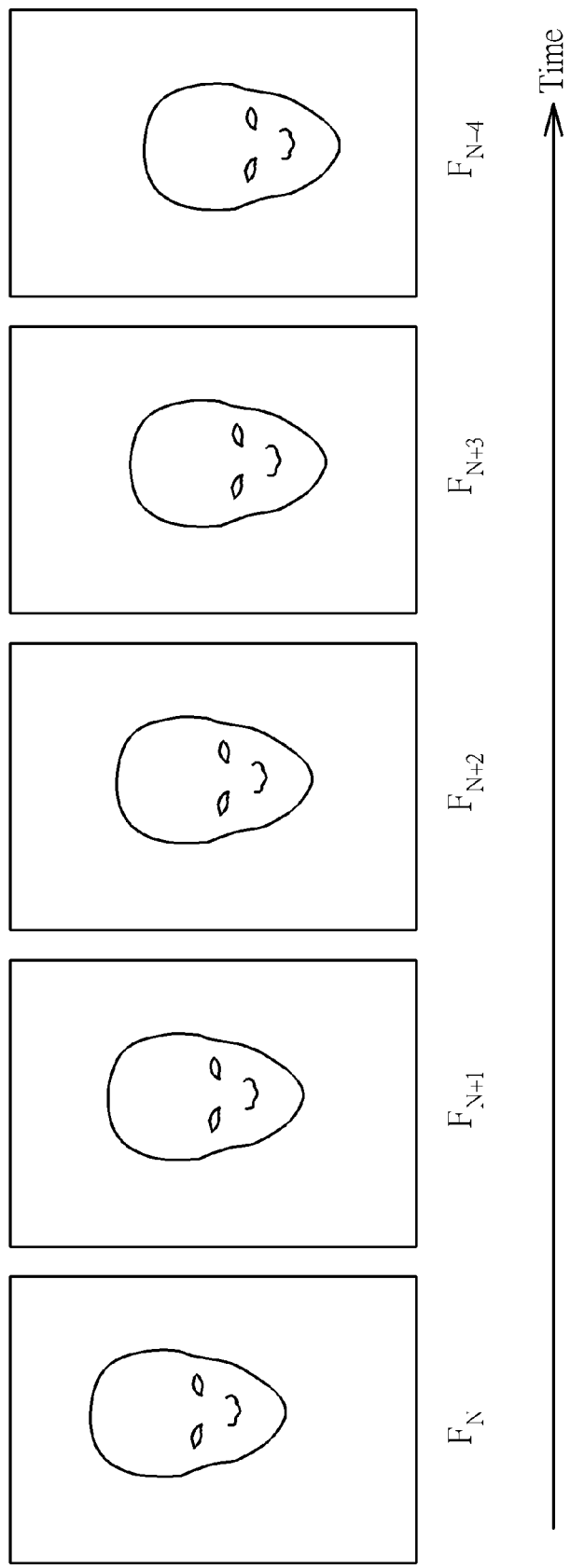

Please refer to FIGS. 4A and 4B. FIG. 4A is a diagram illustrating a first example of the polygon images, and FIG. 4B is a diagram illustrating a second example of the polygon images. For example, the processing unit 120 calculates and analyzes the characteristic parameter such as the median point (i.e. kernel) and then can obtain the time variation about the parameter of median point. As shown in FIG. 4A, the frames $F_N$-$F_{N+4}$ respectively show different polygon images at different timings. The processing unit 120 can detect that the median point is shifted/moved up to the top of the whole image, and this indicates the user may move up his/her head or tilt back the head back. In a default setting, according to the user's habit, the processing unit 120 determines that the user hopes to scroll up or perform a page up command in the display screen, and the processing unit 120 is arranged to control the display device 115 or is used with the display device 115 to perform a scrolling up operation/function or a page up operation/function in the display screen. However, this is merely used for explanation and is not meant to be a limitation of the present invention. Additionally, as shown in FIG. 4B, the frames $F_N$-$F_{N+4}$ respectively show different polygon images at different timings. The processing unit 120 can detect that the median point is shifted/moved down to the bottom of the whole image, and this indicates the user may move down his/her head or tilt forwards the head back. In a default setting, according to the user's habit, the processing unit 120 determines that the user hopes to scroll down or perform a page down command in the display screen, and the processing unit 120 is arranged to control the display device 115 or is used with the display device 115 to perform a scrolling down operation/function or a page down operation/function in the display screen. However, this is merely used for explanation and is not meant to be a limitation of the present invention.

Figure 4C:
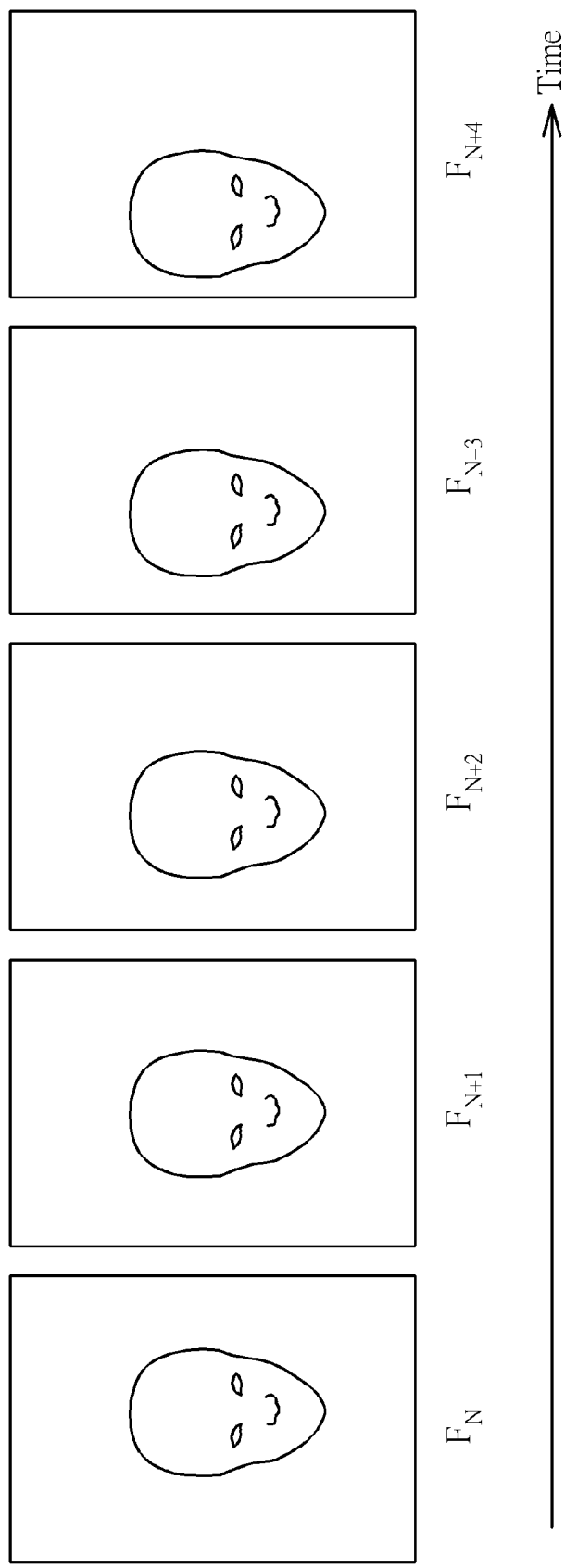
Figure 4D:
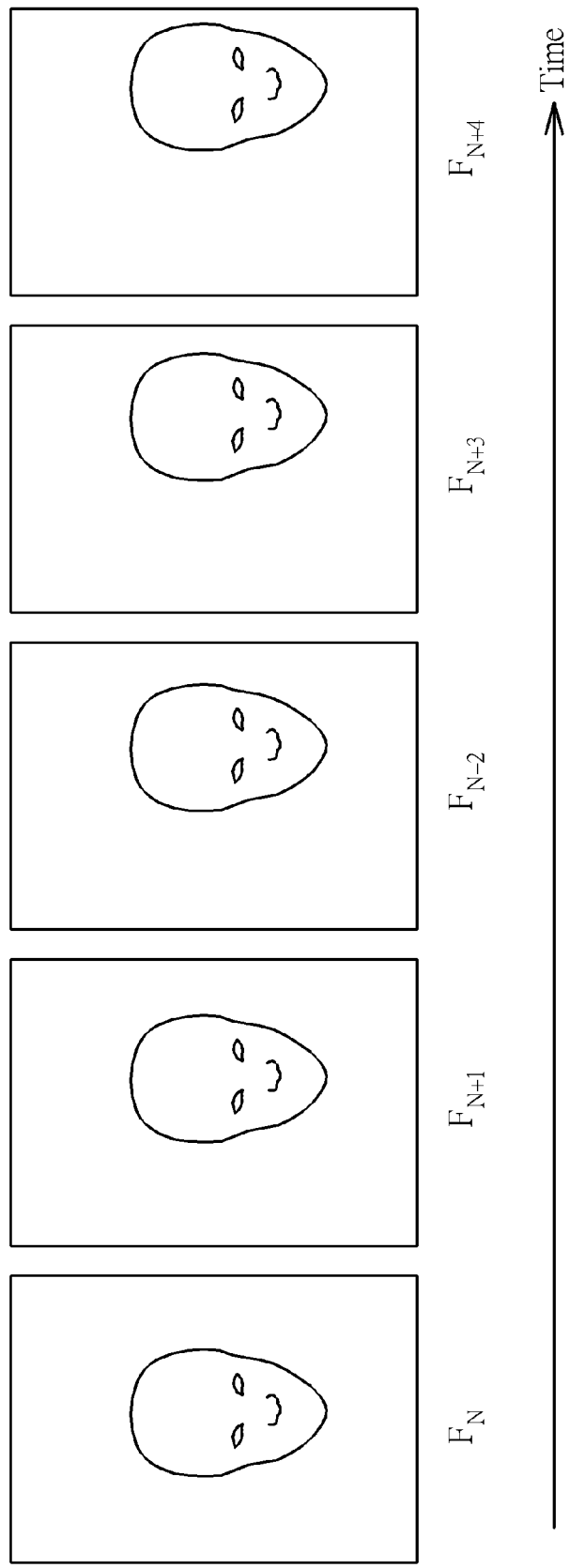

Please refer to FIGS. 4C-4D, which are diagrams illustrating the third and fourth examples of the polygon images. As shown in FIG. 4C, the processing unit 120 can detect that the median point is shifted/moved to the left, and this indicates the user may move his/her head to the left or turn the head to the left. In a default setting, according to the user's habit, the processing unit 120 determines that the user hopes to perform a page left command in the display screen, and the processing unit 120 is arranged to control the display device 115 or is used with the display device 115 to perform a page left operation/function in the display screen. As shown in FIG. 4D, the processing unit 120 can detect that the median point is shifted/moved to the right, and this indicates the user may move his/her head to the right or turn the head to the right. In a default setting, according to the user's habit, the processing unit 120 determines that the user hopes to perform a page right command in the display screen, and the processing unit 120 is arranged to control the display device 115 or is used with the display device 115 to perform a page right operation/function in the display screen.

It should be noted that in above examples the characteristic parameter of median point can be used with other characteristic parameter(s) such as the similarity and/or the mean length/width to detect what command is made by the user. For example, by detecting time variations about the similarity, the mean length, and/or the mea width, the processing unit 120 can detect that the user may tilt his/her back or forwards or turn the head to the left or right so that what command made by the user can be correctly detected. For brevity, this is not detailed here again.

Additionally, for example, the user may bring the interactive device 100 to the face, move the face close to the interactive device 100, or/and bring the face and the interactive device 100 in proximity to each other. In addition, the user may take the interactive device 100 away from the face, move the face away from the interactive device 100, or/and take the face and the interactive device 100 away from each other. In this situation, the processing unit 120 detects that a significant change on time variation of the characteristic parameter of ratio occurs, and then the processing unit 120 recognizes or identifies the behavior of the user as a zooming in/out action. The processing unit 120 can detect the time variation about the ratios when the user hopes to zoom in or zoom out the content displayed in the display screen, and thus the processing unit 120 can identify that the user hopes to zoom in the content or instead zoom out the content.

Figure 5A:
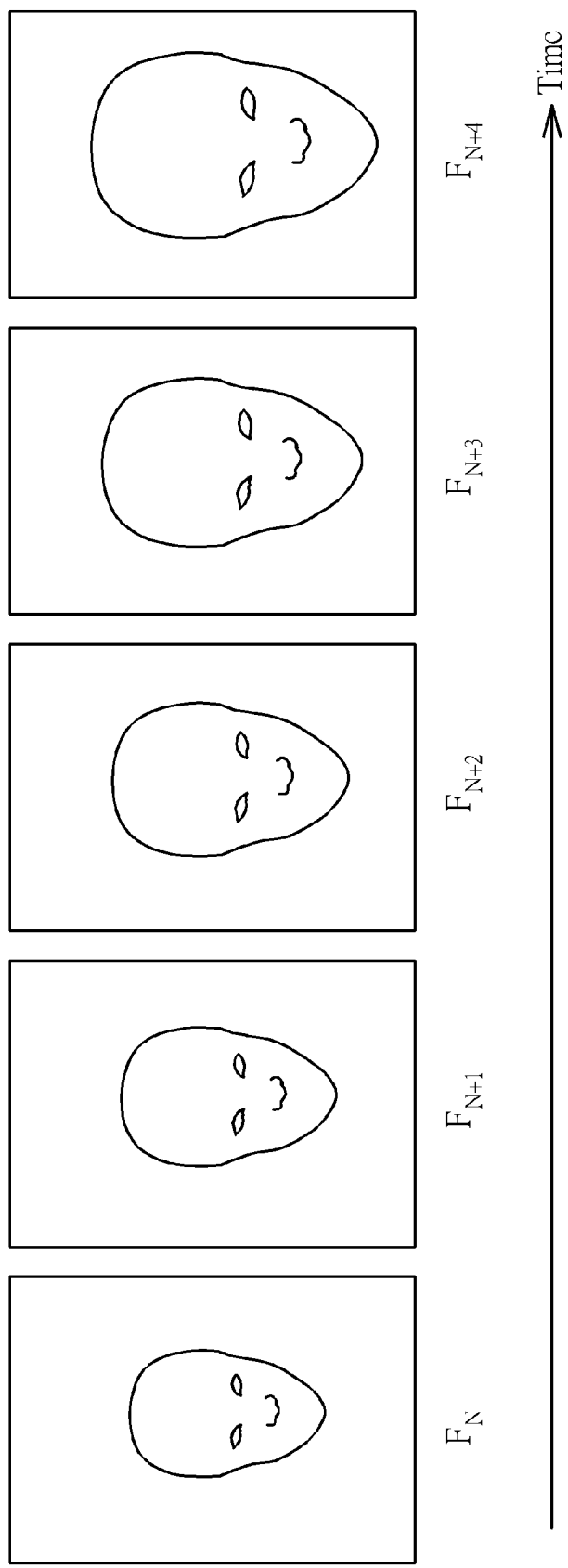
FIGS. 5A-5C are diagrams illustrating other different examples of the polygon images.
Figure 5B:
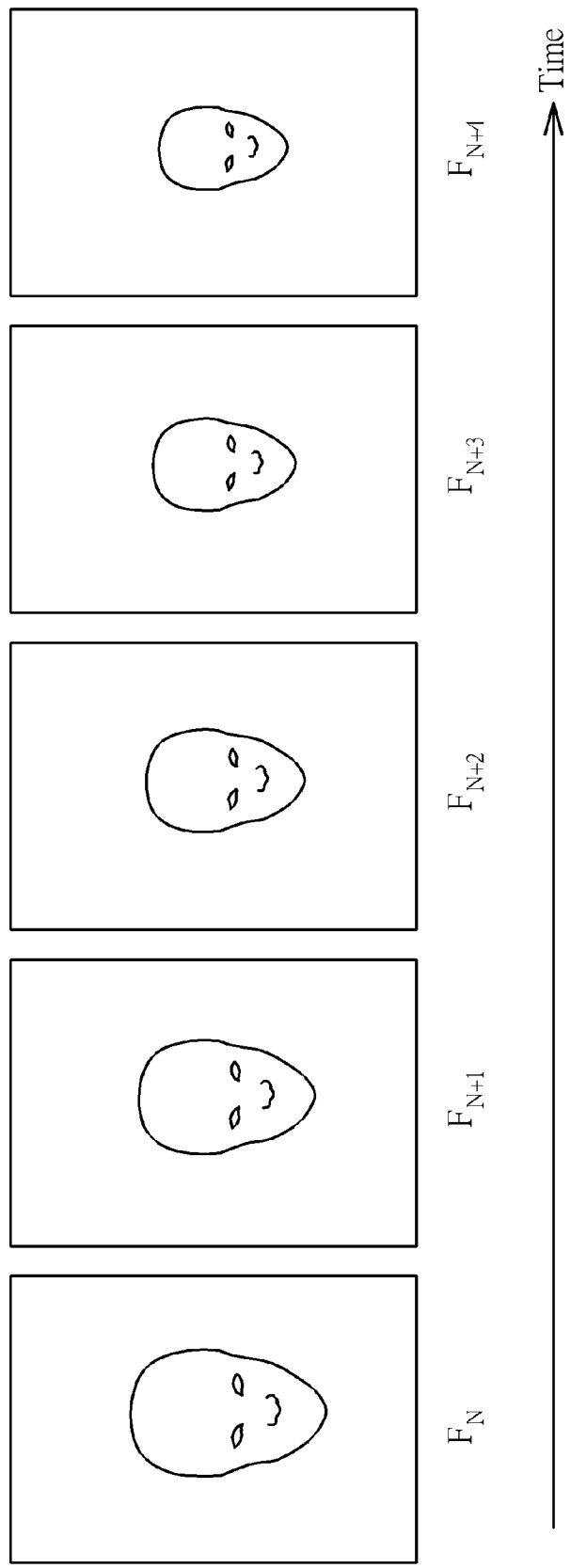

Please refer to FIGS. 5A-5B. FIG. 5A is a diagram illustrating a fifth example of the polygon images, and FIG. 5B is a diagram illustrating a sixth example of the polygon images. For example, the processing unit 120 calculates and analyzes the characteristic parameter about the ratios. As shown in FIG. 5A, the frames $F_N$-$F_{N+4}$ respectively show different polygon images at different timings. The processing unit 120 can detect that the ratios of polygon images gradually becomes larger, and this indicates the user may bring the interactive device 100 to the face, move the face close to the interactive device 100, or/and bring the face and the interactive device 100 in proximity to each other. In a default setting, according to the habit of a person of good eyesight or a shortsighted person's habit, the processing unit 120 in this situation determines that the user hopes to view the content more clearly, and the processing unit 120 is arranged to control the display device 115 or is used with the display device 115 to perform a zooming in operation/function in the display screen. Instead, in an alternative setting, according to a longsighted person's habit, the processing unit 120 in this situation may be arranged to control the display device 115 or is used with the display device 115 to perform a zooming out operation/function in the display screen.

As shown in FIG. 5B, the frames $F_N$-$F_{N+4}$ respectively show different polygon images at different timings. The processing unit 120 can detect that the ratios of polygon images gradually becomes smaller, and this indicates the user may take the interactive device 100 away from the face, move the face away from the interactive device 100, or/and take the face and the interactive device 100 away from each other. In a default setting, according to the habit of a person of good eyesight or a shortsighted person's habit, the processing unit 120 in this situation determines that the user hopes to view the content in a broader view or the user may hope to view more contents, and the processing unit 120 is arranged to control the display device 115 or is used with the display device 115 to perform a zooming out operation/function in the display screen. Instead, in an alternative setting, according to a longsighted person's habit, the processing unit 120 in this situation determines that the user hopes to view the content more clearly, and is arranged to control the display device 115 or is used with the display device 115 to perform a zooming in operation/function in the display screen.

Figure 5C:
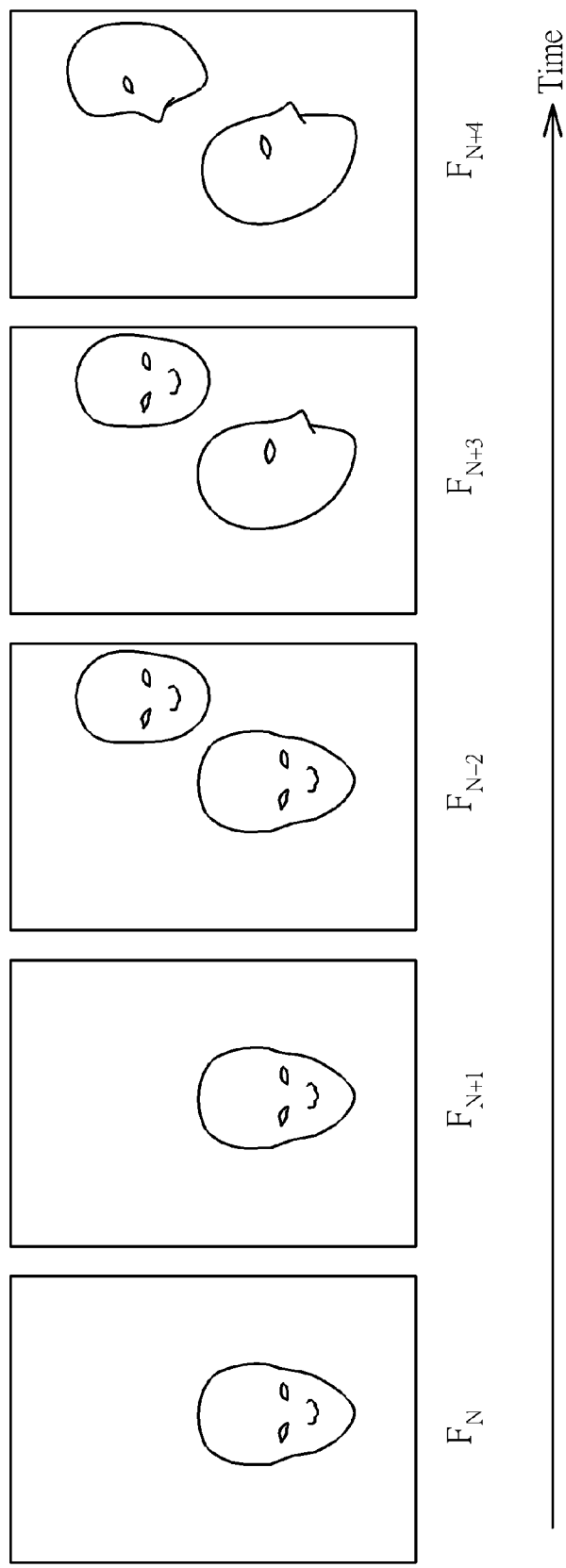

Additionally, the processing unit 120 can be arranged to automatically pause or interrupt a process/software application being currently operated by a user when detecting a predetermined behavior of the user and/or detecting some predetermined conditions. For example, the processing unit 120 can be used with the camera circuit 105 to detect whether a user and another person have a talk currently or not. Please refer to FIG. 5C, which is diagram illustrating a seventh example of the polygon images. As shown in FIG. 5C, the frames $F_N$-$F_{N+4}$ respectively show different polygon images at different timings. The processing unit 120 can detect that a second face-like polygon image occurs in the frame $F_{N+2}$ (i.e. two polygon images), the width of the original face-like polygon image becomes shorter in the frame $F_{N+3}$, and the widths of two face-like polygon images become shorter in the frame $F_{N+4}$. This indicates the user may have an unexpected talk with another person. By detecting the time variation of the characteristic parameter such as the widths of the polygon images, the processing unit 120 can detect that the user is turning his/her head to the right or to the left (in another example), and can also detect that another person is turning his/her head to the left or to the right (in another example). When detecting that the width of at least one polygon image becomes shorter, the processing unit 120 can determine that the user may have an unexpected talk with another person. In a default setting, the processing unit 120 determines that the user hopes to have a short talk with another person, and the processing unit 120 is arranged to control the display device 115 or is used with the display device 115 to perform a predetermined process/function to automatically pause, stop, or suspend the process/software application being currently operated by the user until the processing unit 120 detects that the user is facing forward to the interactive device 100. For example, a video/movie watched by the user may be automatically paused, stopped, or suspended by the processing unit 120 when the processing unit 120 detects that the user would like to have a short talk with another person. It should be noted that the example of polygon images shown in FIG. 5C is merely used for illustrative purposes and is not meant to be a limitation of the invention.

Further, the operations mentioned in the flowchart shown in FIG. 2B can be designed to be executed only when the interactive device 100 executes a specific software application/process such as a Web browser, a document editor program, and so on. For example, the processing unit 120 may be arranged to recognize or identify the behavior of the user as a scroll action especially when the display screen of the interactive device 100 is staying on the Web browser or document editor program including a scroll bar. This modification can save more power to avoid unnecessary power consumption.

Accordingly, based on the preceding description, the processing unit 120 can recognize or identify the behavior of the user as the scroll action or the zoom action according to the obtained time variation of characteristic parameter(s). In addition, more specifically, the processing unit 120 can identify what command corresponds to the action made by the user, so that the processing unit 120 can control the display device 115 or can be used with the display device 115 to perform a predetermined process in response to the behavior of the user or his/her action.

Figure 6:
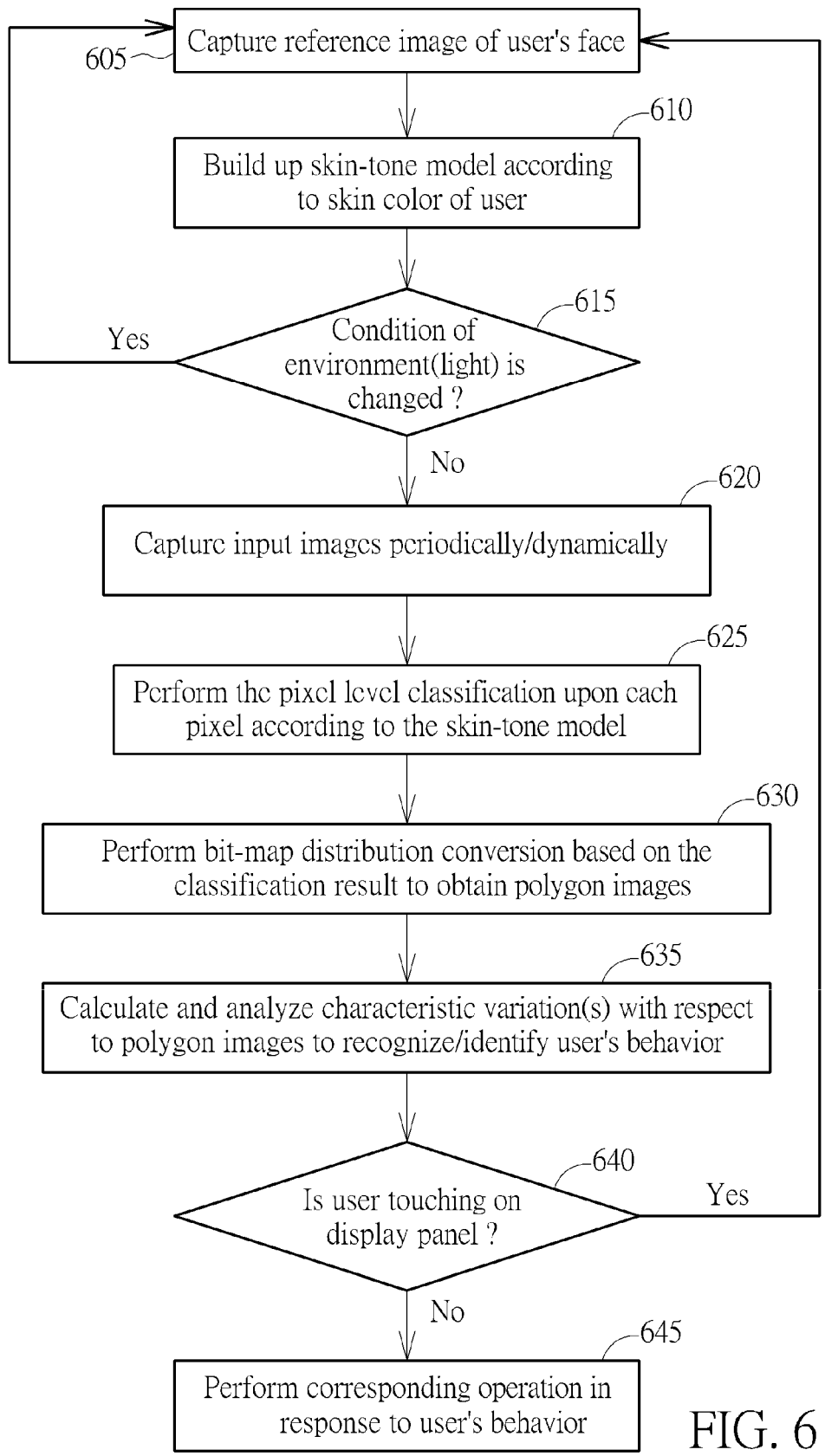
FIG. 6 is a flowchart diagram illustrating the operations of interactive device as shown in FIG. 1 according another embodiment of the present invention.

Further, in another embodiment, the operations of the interactive device 100 may be associated with different flowchart steps. This modification also obeys the spirit of the invention. Please refer to FIG. 6, which is a flowchart diagram illustrating the operations of interactive device 100 according another embodiment of the present invention. Provided that substantially the same result is achieved, the steps of the flowchart shown in FIG. 6 need not be in the exact order shown and need not be contiguous, that is, other steps can be intermediate. The description of the steps mentioned in FIG. 6 is described in the following.

Step 605: The camera circuit 105 is arranged to capture at least one reference image of the user's face;

Step 610: The processing unit 120 is arranged to build up a skin-tone model according to skin color of the user's face included in the at least one reference image;

Step 615: The processing unit 120 is arranged to perform environmental condition detection such as light condition detection to check whether the condition of the environment is changed or not after waiting a predetermined time period. If the environmental condition is changed, the flow proceeds to Step 605; otherwise, the flow proceeds to Step 620;

Step 620: The camera circuit 105 is arranged to periodically/dynamically capture input images;

Step 625: The processing unit 120 is arranged to perform the pixel level classification upon each pixel according to the skin-tone model;

Step 630: The processing unit 120 is arranged to execute or perform a bit-map conversion based on the classification result generated in Step 625 to obtain polygon images;

Step 635: The processing unit 120 is arranged to calculate and analyze at least one characteristic parameter with respect to the polygon images to recognize/identify the behavior of the user;

Step 640: The processing unit 120 checks whether the user touches on the display panel. If the user is touching on the display panel, the flow proceeds to Step 605; otherwise, the flow proceeds to Step 645; and Step 645: the processing unit 120 controls the display device 115 or is used with the display device 115 to perform a predetermined process in response to the behavior of the user.

In addition, the above-mentioned operations/functions including zooming in/out, page left/right, page up/down, and/or scrolling up/down are merely used as examples of the invention, and these operation/functions should not be a limitation of the present invention. Other operations/functions can be also suitable for the invention. For example, by performing the operations of processing unit 120 mentioned above in response to the user's behavior, the interactive device 100 can also be arranged to change the hue brightness/color/power control of the display panel, to scale up or down the display frame, to adjust power consumption, to automatically lock/unlock the device 100, and/or to pause/replay a video playback or a video application.

Further, the above-mentioned operations or steps can be performed or executed by software instructions, threads, or codes that can be included within a computer readable medium, and the software instructions, threads, or codes can be executed to recognize a behavior of a user operating on a device without needing the user's touching on this device. In other words, the present invention may be implemented as a system, a method, or a program that can be used in a computer. The instructions, threads, or codes may be recorded in the computer readable medium such as a hard disk, a CD-ROM, a DVD-ROM, an optical storage device, or a magnetic storage device. In addition, the instructions, threads, or codes may be recorded in another computer and can be fetched via network. In addition, the present invention may be implemented as a combination of hardware and software.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A method used in an interactive device and for recognizing a behavior of a user operating on the interactive device, and the method comprises:
    capturing a plurality of images;
    forming a plurality of polygon images of a first face-like contour shape and a plurality of polygon images of a second face-like contour shape corresponding to the plurality of captured images according to a skin-tone model, the first face-like contour shape and the second face-like contour shape occurring in one of the plurality of captured images; and
    recognizing the behavior of the user operating on the interactive device and performing a corresponding function to automatically pause, stop, or suspend a process/software application being currently operated by the user in response to the recognized behavior of the user by analyzing time variation of at least one characteristic parameter with respect to the plurality of polygon images of the first face-like contour shape and time variation of at least one characteristic parameter with respect to the plurality of polygon images of the second face-like contour shape, the at least one characteristic parameter comprising widths of the plurality of polygon images of the first face-like contour shape and widths of the plurality of polygon images of the second face-like contour shape.

2. The method of claim 1, further comprising:
    according to at least one reference image, generating the skin-tone model;
    wherein the at least one reference image is captured when the interactive device is turned on, the interactive device starts to perform a predetermined process, or a light condition change is detected.

3. The method of claim 1, wherein the step of forming the plurality of polygon images of the first face-like contour shape and the plurality of polygon images of the second face-like contour shape corresponding to the plurality of captured images according to the skin-tone model comprises:
    generating a plurality of bit-maps which indicate a plurality of bit 0/1 distributions corresponding to the plurality of captured images according to the skin-tone model; and
    forming the plurality of polygon images of the first face-like contour shape and the plurality of polygon images of the second face-like contour shape according to the plurality of bit-maps.

4. The method of claim 3, wherein the step of generating the plurality of bit-maps corresponding to the plurality of captured images according to the skin-tone model comprises:
    generating the plurality of bit-maps by classifying pixels included in the plurality of captured images into either a bit 0 or a bit 1 according to the skin-tone model.

5. An interactive device used for recognizing a behavior of a user operating on the interactive device, and the interactive device comprises:
    a camera circuit, for capturing a plurality of images; and
    a processing unit, coupled to the camera circuit, for forming a plurality of polygon images of a first face-like contour shape and a plurality of polygon images of a second face-like contour shape corresponding to the plurality of captured images according to a skin-tone model, the first face-like contour shape and the second face-like contour shape occurring in one of the plurality of captured images, and recognizing the behavior of the user operating on the interactive device and performing a corresponding function to automatically pause, stop, or suspend a process/software application being currently operated by the user in response to the recognized behavior of the user by analyzing time variation of at least one characteristic parameter with respect to the plurality of polygon images of the first face-like contour shape and time variation of at least one characteristic parameter with respect to the plurality of polygon images of the second face-like contour shape, the at least one characteristic parameter comprising widths of the plurality of polygon images of the first face-like contour shape and widths of the plurality of polygon images of the second face-like contour shape.

6. The interactive device of claim 5, wherein the camera circuit is arranged to capture at least one reference image when the interactive device is turned on, the interactive device starts to perform a predetermined process, or a light condition change is detected; and, the processing unit is arranged to generate the skin-tone model according to the at least one reference image.

7. The interactive device of claim 5, wherein the processing unit is arranged to generate a plurality of bit-maps which indicate a plurality of bit 0/1 distributions corresponding to the plurality of captured images according to the skin-tone model, and arranged to form the plurality of polygon images of the first face-like contour shape and the plurality of polygon images of the second face-like contour shape according to the plurality of bit-maps.

8. The interactive device of claim 7, wherein the processing unit is arranged to generate the plurality of bit-maps by classifying pixels included in the plurality of captured images into either a bit 0 or a bit 1 according to the skin-tone model.

9. A non-transitory computer readable medium comprising multiple instructions upon executing these instructions and for recognizing a behavior of a user operating on the interactive device, a computer performing the following steps:
    capturing a plurality of images;
    forming a plurality of polygon images of a first face-like contour shape and a plurality of polygon images of a second face-like contour shape corresponding to the plurality of captured images according to a skin-tone model, the first face-like contour shape and the second face-like contour shape occurring in one of the plurality of captured images; and
    recognizing the behavior of the user operating on the interactive device and performing a corresponding function to automatically pause, stop, or suspend a process/software application being currently operated by the user in response to the recognized behavior of the user by analyzing time variation of at least one characteristic parameter with respect to the plurality of polygon images of the first face-like contour shape and time variation of at least one characteristic parameter with respect to the plurality of polygon images of the second face-like contour shape, the at least one characteristic parameter comprising widths of the plurality of polygon images of the first face-like contour shape and widths of the plurality of polygon images of the second face-like contour shape.

10. The computer readable medium of claim 9, the computer further performs steps:

according to at least one reference image, generating the skin-tone model;

wherein the at least one reference image is captured when the interactive device is turned on, the interactive device starts to perform a predetermined process, or a light condition change is detected.

11. The computer readable medium of claim 9, wherein the step of forming the plurality of polygon images of the first face-like contour shape and the plurality of polygon images of the second face-like contour shape corresponding to the plurality of captured images according to the skin-tone model comprises:

generating a plurality of bit-maps which indicate a plurality of bit 0/1 distributions corresponding to the plurality of captured images according to the skin-tone model; and forming the plurality of polygon images of the first face-like contour shape and the plurality of polygon images of the second face-like contour shape according to the plurality of bit-maps.

12. The computer readable medium of claim 11, wherein the step of generating the plurality of bit-maps corresponding to the plurality of captured images according to the skin-tone model comprises:

generating the plurality of bit-maps by classifying pixels included in the plurality of captured images into either a bit 0 or a bit 1 according to the skin-tone model.

* * * * *